United States Patent [19]

Manske et al.

[11] 3,952,591
[45] Apr. 27, 1976

[54] MACHINE FOR CLEANING AND INSPECTING MOTION PICTURE FILMS

[75] Inventors: Warren C. Manske; Robert Bretl; Donald Dupont, all of Menominee, Mich.

[73] Assignee: Bay Electric Company, Menominee, Mich.

[22] Filed: Aug. 15, 1974

[21] Appl. No.: 497,658

[52] U.S. Cl. ................................. 73/157; 73/431
[51] Int. Cl.² .................... G01B 5/16; G01D 11/30
[58] Field of Search ................ 73/157, 156; 15/100; 250/572; 356/200, 199; 352/130

[56] References Cited
UNITED STATES PATENTS

| | | | |
|---|---|---|---|
| 2,297,222 | 9/1942 | Kemna | 356/200 |
| 2,699,676 | 1/1955 | Grunwald et al. | 73/157 |
| 2,927,602 | 3/1960 | Elklund | 73/431 |
| 3,609,020 | 9/1971 | Kelly | 352/130 |
| 3,693,430 | 9/1972 | Menary | 73/159 |
| 3,778,631 | 12/1973 | Allinger | 250/572 |
| 3,856,414 | 12/1974 | Menary | 250/572 |

*Primary Examiner*—S. Clement Swisher
*Attorney, Agent, or Firm*—Wallenstein, Spangenberg, Hattis & Strampel

[57] ABSTRACT

A machine which is capable of cleaning and inspecting motion picture films with respect to splices, tears or breaks, sprocket hole elongation, or the like, includes a supporting frame, a rewind motor assembly and rewind reel, a take up motor assembly and take up reel, and motor control means for controlling the rewind and take up motor assemblies, the motion picture film extending between the rewind reel and take up reel. The machine frame has provision for selectively receiving separate and independent modules along the motion picture film between the rewind and take up reels. Each separate module has a panel which is removably securable to the frame. One of the modules is a motion picture film cleaning module, another is a motion picture film inspecting module, and still another is a capstan module. Each module may differ in construction and operation and be substitutable one for another, although certain modules are preferred. Any one or more or all of the cleaning, inspecting and capstan modules may be removably secured to the frame.

17 Claims, 22 Drawing Figures

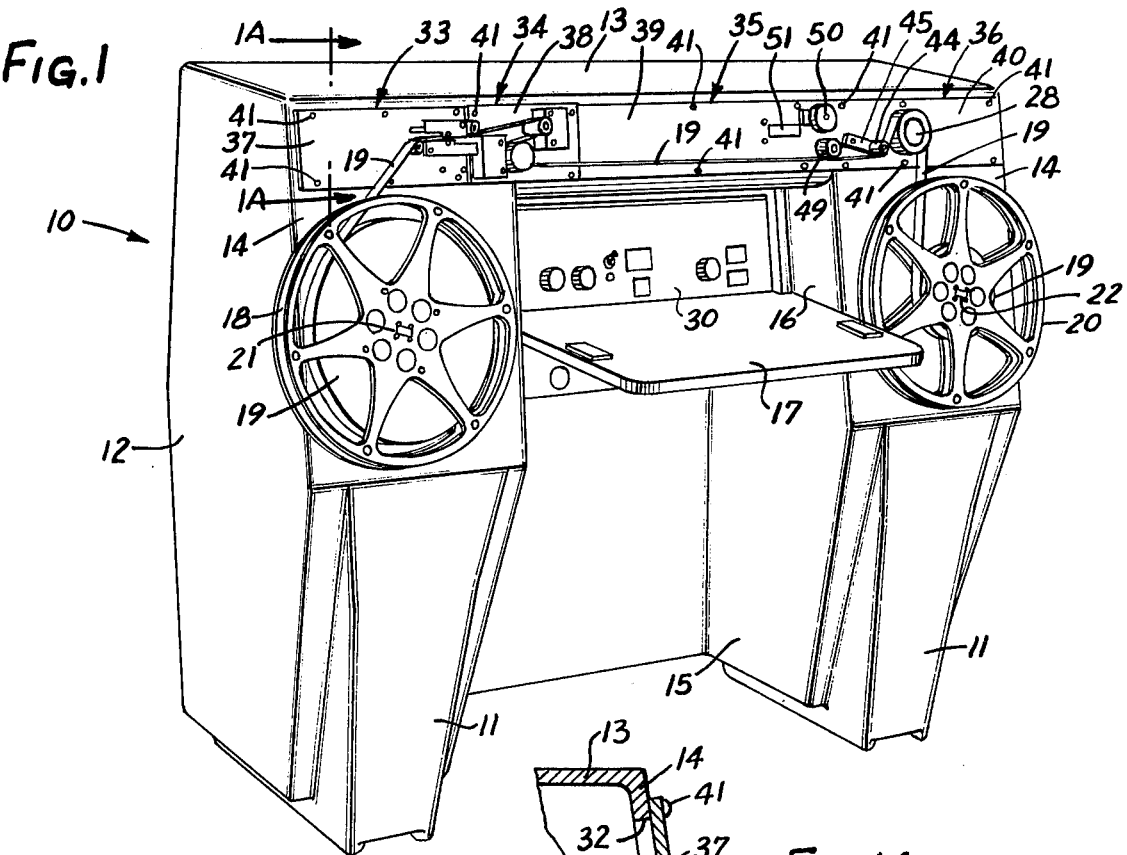
Fig.1
Fig.1A
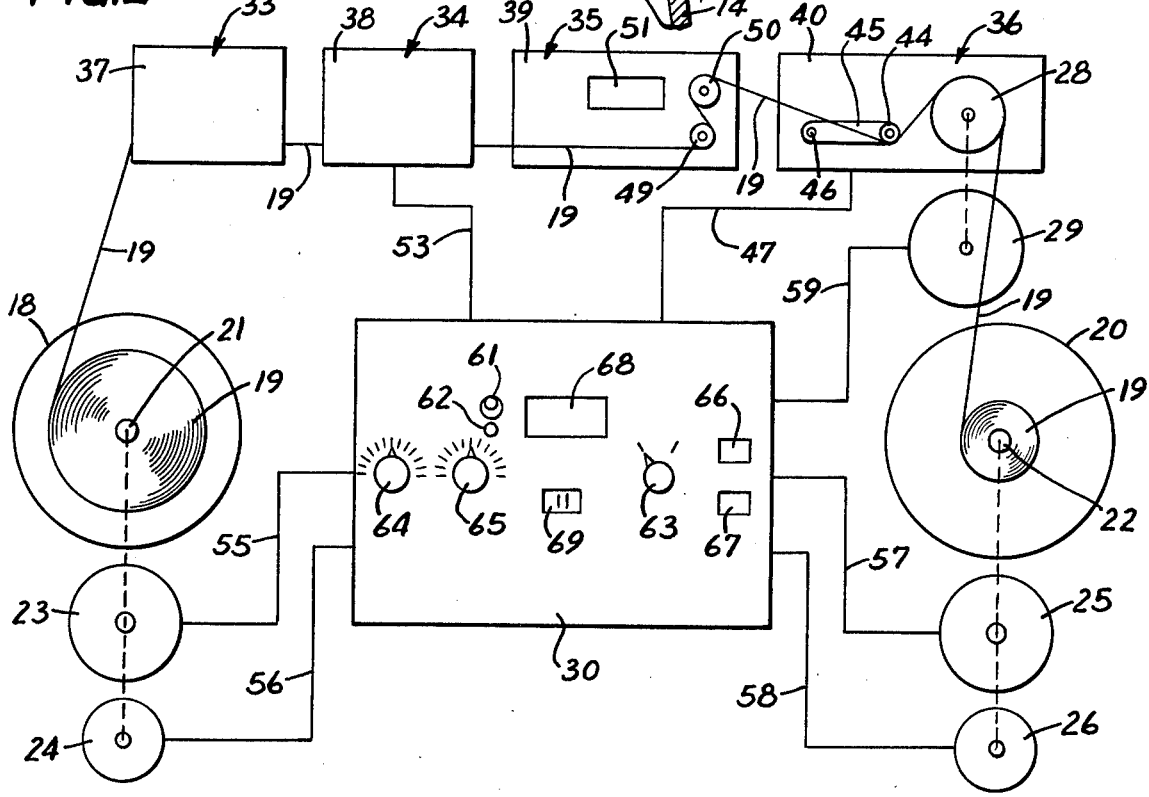
Fig.2

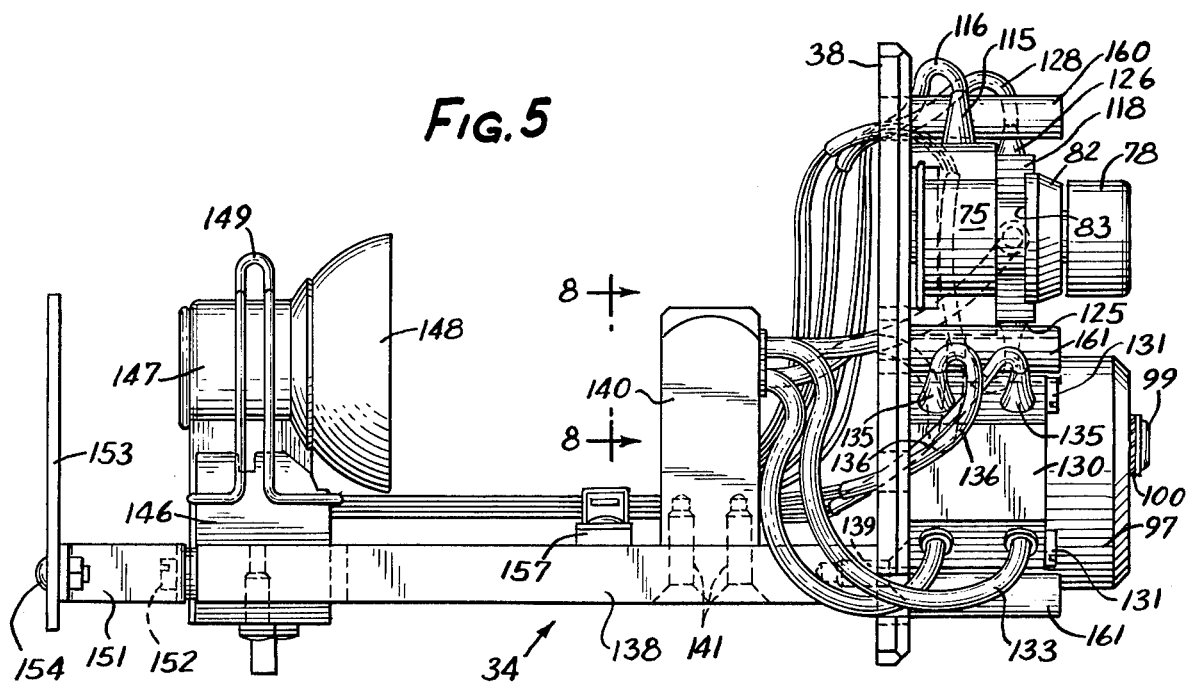
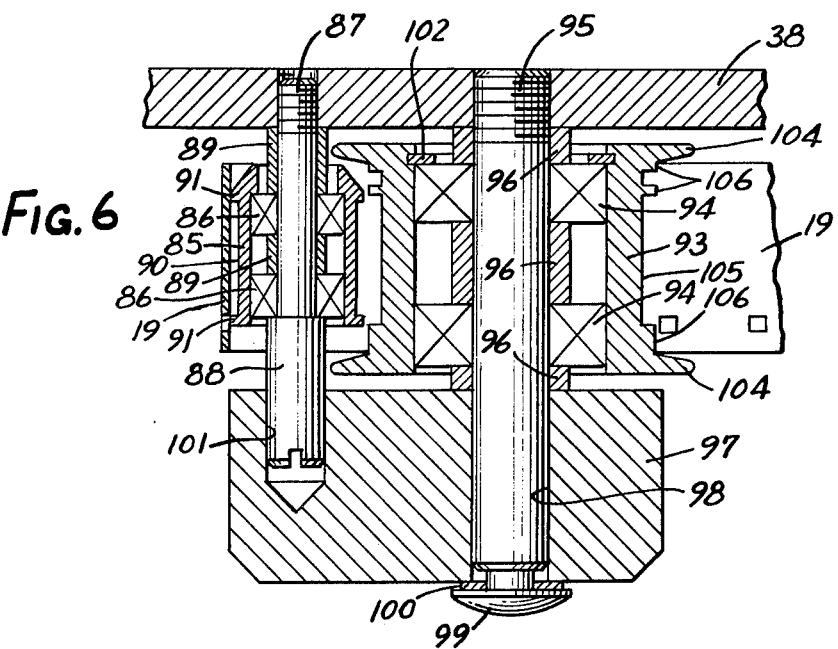
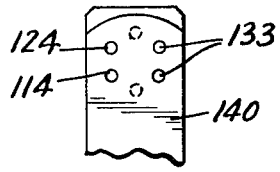
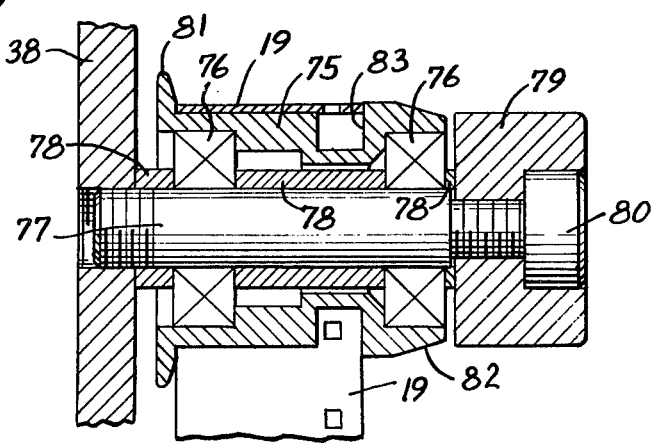

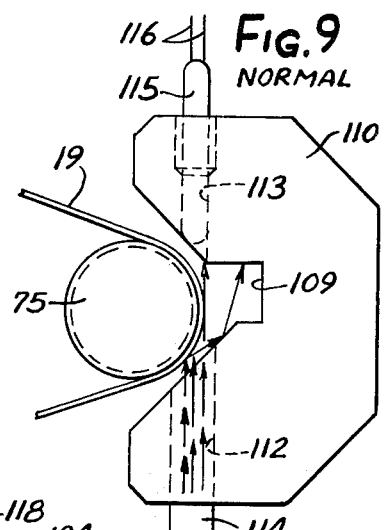
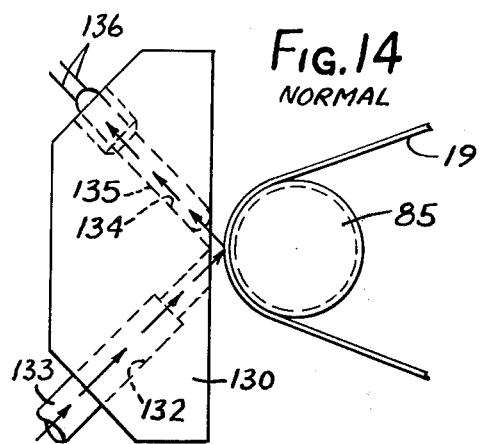
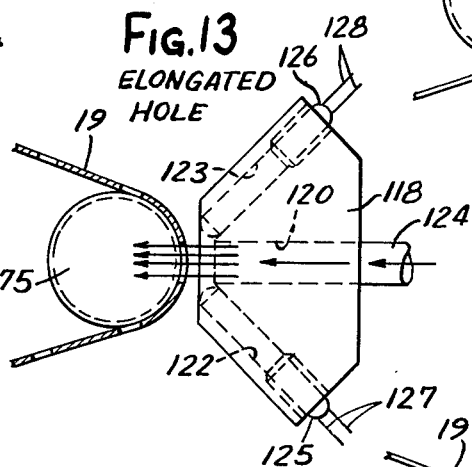
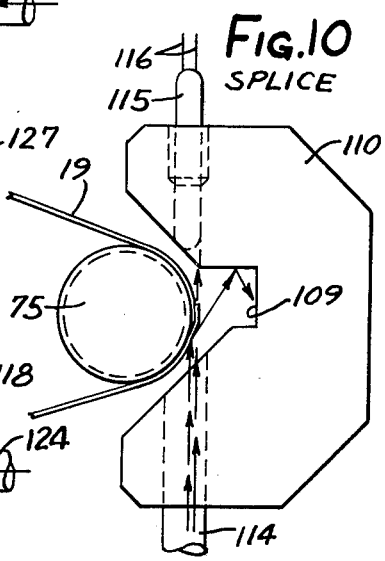
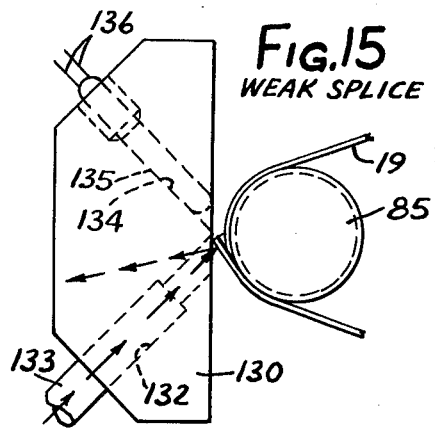
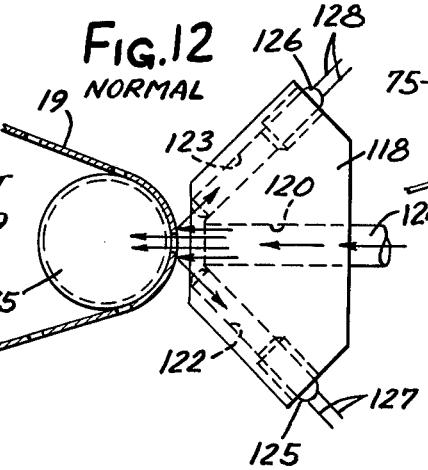
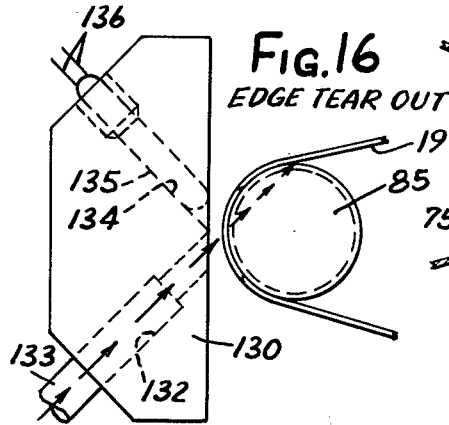
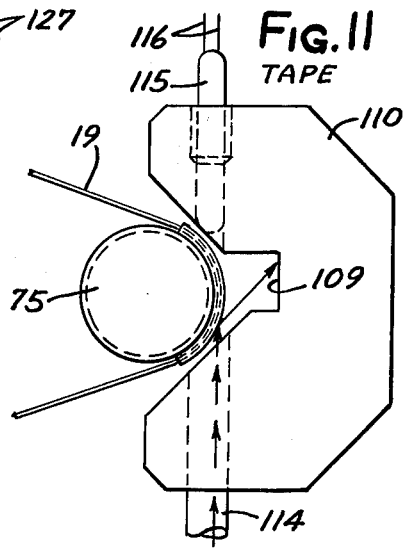
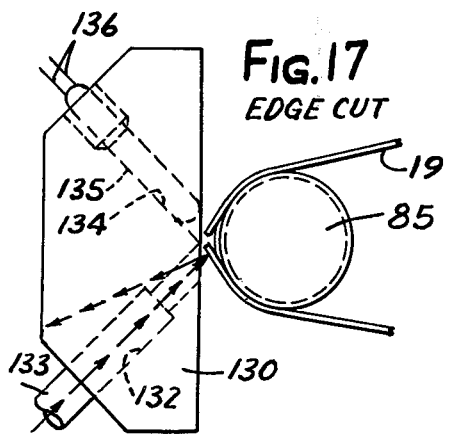

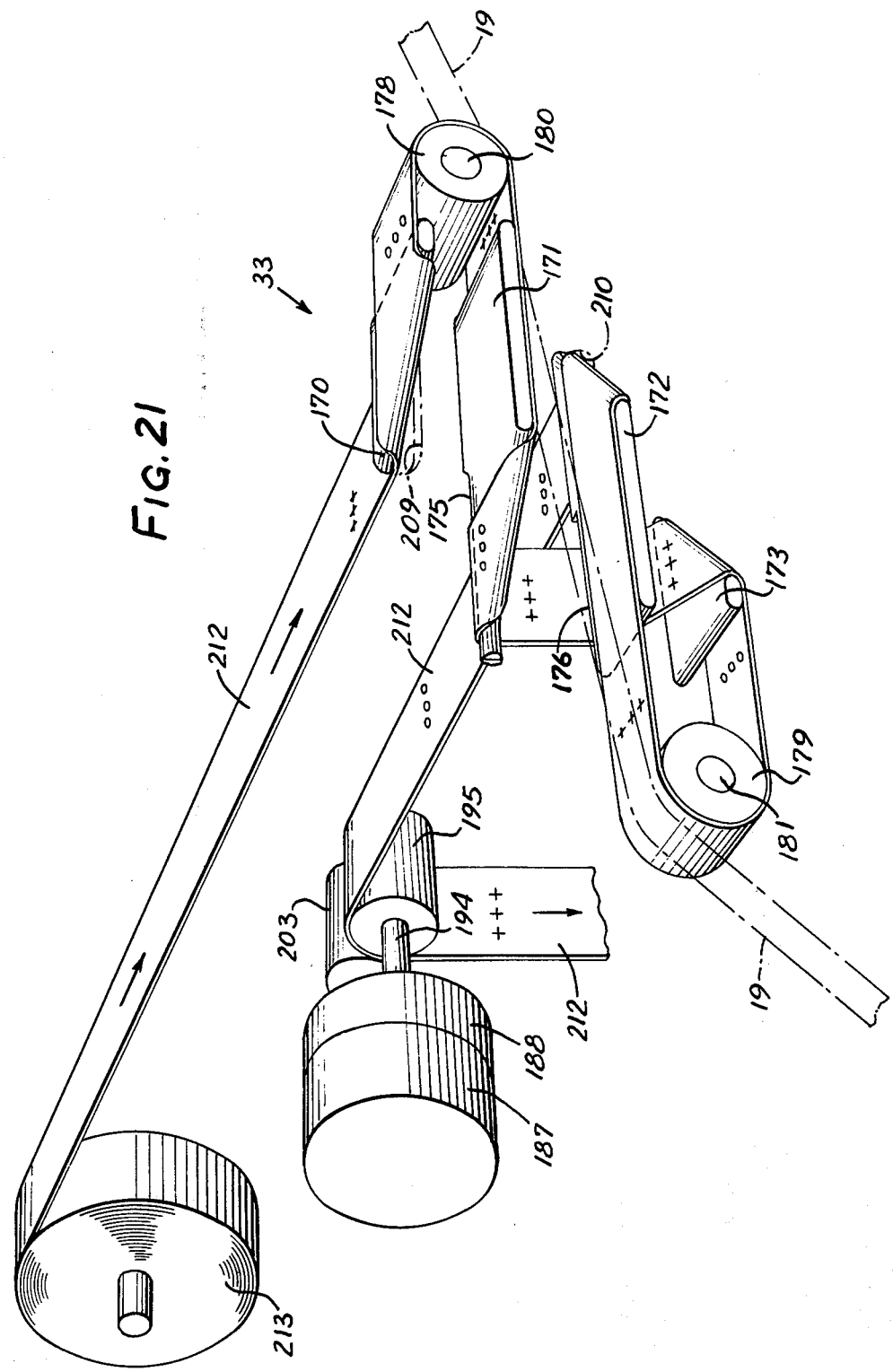

MACHINE FOR CLEANING AND INSPECTING MOTION PICTURE FILMS

This invention has to do with improvements in a machine which is capable of cleaning motion picture films and inspecting motion picture films with respect to splices, tears or breaks, sprocket hole elongations, or the like. Briefly, such machines conventionally include a supporting frame, a rewind motor assembly carried by the frame having a rewind spindle for removably receiving a rewind reel containing a motion picture film to be cleaned and/or inspected and/or a motion picture film to be rewound thereon, and a take up motor assembly carried by the frame, spaced from the rewind motor assembly, having a take up spindle for removably receiving a take up reel to receive and wind thereon a motion picture film which has been cleaned and/or inspected. The motion picture film extends between the rewind reel and the take up reel. Some of such machines may also have a capstan motor assembly carried by the frame driving a capstan engaging the motion picture film for advancing the same at constant linear speed from the rewind reel to the take up reel. Such machines also include motor control means for controlling the take up motor assembly and the rewind motor assembly and also the capstan motor assembly if utilized.

Such conventional machines also include cleaning means carried by the frame and/or inspecting means carried by the frame, in addition to the capstan motor assembly, if used, also carried by the frame. Such machines have accordingly been constructed in accordance with the functions to be performed thereby, namely, cleaning and/or inspecting and/or constant film speed, requiring building and stocking a number of different model machines. Furthermore, the use of various different cleaning means and/or inspecting means having different characteristics and costs are quite often desirable and this requires further building and stocking of different machines, thus compounding the problem.

The principal object of this invention is to eliminate or diminish the foregoing problems. Briefly, in accordance with this invention, the frame of the machine is provided with means for selectively receiving separate modules along the motion picture film between the rewind reel and the take up reel. One of the separate modules comprises a motion picture film cleaning module having a panel removably securable to the module receiving means of the frame and cleaning means carried by the panel for cleaning both sides of the motion picture film as it passes thereby. Another of said modulels comprises a motion picture film inspecting module having a panel removably securable to the module receiving means of the frame and detecting means carried by the panel for inspecting the motion picture film as it passes with respect to splices, tears or breaks, sprocket hole elongation, or the like. Still another separate module comprises a capstan module having a panel removably securable to the module receiving means of the frame and a capstan motor assembly carried by the panel including a capstan engaging the motion picture film for advancing the same at constant linear speed from the rewind reel to the take up reel.

The cleaning means of the motion picture cleaning module may take various structural forms depending upon the desired characteristics and cost factors, such as, for example, the motion picture film cleaning means disclosed in U.S. Pat. No. 3,693,430 or as specifically disclosed herein and in copending application Ser. No. 497,655, filed Aug. 15, 1974 and now U.S. Pat. No. 3,906,579, the latter being preferred. Such film cleaning modules in accordance with this invention may be interchangeably used or they may be omitted if desired. The detecting means of the motion picture inspecting module may also take various structural forms depending upon the desired characteristics and cost factors, such as, for example, the motion picture film inspecting means disclosed in U.S. Pat. No. 3,693,430 or U.S. Pat. No. 3,856,414 or as specifically disclosed herein and in copending application Ser. No. 497,535, filed Aug. 15, 1974, the latter being preferred. Such film inspecting modules in accordance with this invention may also be interchangeably used or they may be omitted if desired. The capstan module may also be used or omitted, as desired.

By appropriately selecting the various separate modules (the film cleaning module, the film inspecting module and the capstan module) and removably securing the selected modules to the module receiving means of the frame, it is only necessary to utilize one frame construction which can be readily modularly adapted for desired uses and results with the result that problems of building and stocking of a large number of different machines is substantially eliminated or at least greatly minimized. When the separate motion picture film inspecting module and/or the capstan module are removably secured in the module receiving means of the frame, they are readily electrically coupled to the motor control means to stop the take up motor assembly and rewind motor assembly, and the capstan motor assembly, if utilized, in the event of improper slices, tears or breaks, sprocket hole elongations, or the like, in the motion picture film as it passes the motion picture film inspecting module.

Briefly, the detecting means of the preferred form of the motion picture film inspecting module, described herein and modularly used in combination with the machine, comprises lighting means carried by the module panel for directing light beams on the motion picture film as it is advanced from the rewind reel to the take up reel, the light beams being reflected by the motion picture film, and light detecting means carried by the module panel and controlled by the reflectance of the light beams by the motion picture film for detecting splices, tears or breaks, sprocket hole elongation, or the like, therein.

Also, briefly, the cleaning means of the preferred form of the motion picture cleaning module, described herein and modularly used in combination with the machine, comprises a plurality of cleaning tape guides carried by the module panel with the motion picture film extending therebetween as it is moved between the rewind reel and the take up reel, a single cleaning tape threaded over the cleaning tape guides with one side of the cleaning tape engaging and cleaning one side of the moving motion picture film and with the other side of the cleaning tape engaging and cleaning the other side of the moving motion picture film and means for advancing the cleaning tape over the cleaning tape guides to present fresh cleaning surfaces of the cleaning tape to the motion picture film as it engages and cleans both sides of the moving motion picture film.

Further objects of this invention reside in the combination of the machine and the separate modules usable therewith, the constructions of the modules and the cooperative relationships between the parts thereof and between such modules and the machine.

Other objects and advantages of this invention will become apparent to those skilled in the art upon reference to the accompanying specification, claims, and drawings, in which:

FIG. 1 is a perspective view of a machine for cleaning and inspecting motion picture films including separate cleaning, inspecting, counting, and capstan modules.

FIG. 1A is a partial sictional view through the machine taken substantially along the line 1A—1A of FIG. 1.

FIG. 2 is a diagrammatic illustration of the machine illustrated in FIG. 1 and showing the manner of operation thereof.

FIG. 5 is a side elevational view of the motion picture film inspecting module illustrated in FIGS. 3 and 4.

FIG. 6 is a substantially horizontal sectional view through the motion picture film inspecting module taken substantially along the line 6—6 of FIG. 3.

FIG. 7 is a horizontal sectional view through the motion picture film inspecting module taken substantially along the line 7—7 of FIG. 3.

FIG. 8 is a partial elevational view of a portion of the motion picture film inspecting module taken substantially along the line 8—8 of FIG. 5.

FIGS. 9 to 11 are diagrammatic views illustrating the manner of detecting the presence of splices or tapes in the motion picture film and taken substantially along the line 9—9 of FIG. 4.

FIGS. 12 and 13 are diagrammatic illustrations illustrating the manner of detecting sprocket hole elongations and taken substantially along the line 12—12 of FIG. 4.

FIGS. 14 to 17 are diagrammatic illustrations of the manner of detecting the sprocket and sound edge portions of the motion picture film with respect to weak splices, edge tear outs and edge cuts breaks and taken substantially along the line 14—14 of FIG. 4.

FIG. 21 is a diagrammatic exploded perspective view of the film cleaning module illustrated in FIGS. 18 to 20 showing the course of the threading of the cleaning tape over the cleaning tape guides for cleaning both sides of the moving motion picture film.

Figure 3:
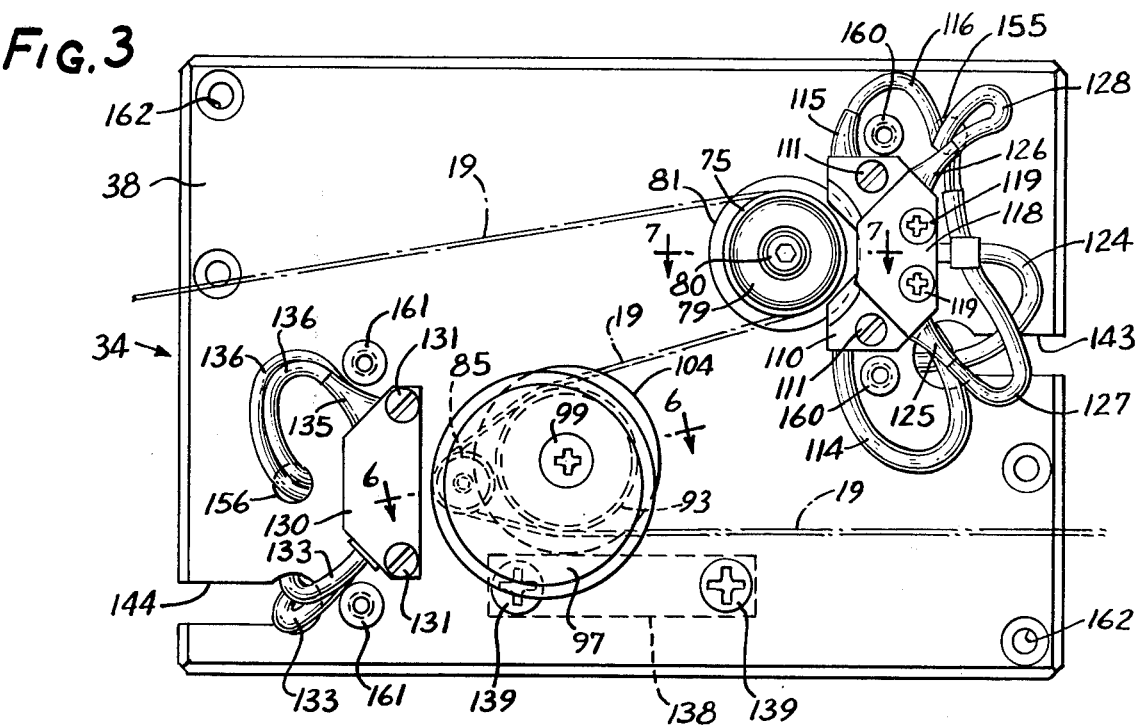
FIG. 3 is a front elevational view with the covers removed of a preferred form of the motion picture film inspecting module utilized in FIG. 1.

Referring first to FIG. 1, a machine for cleaning and inspecting motion picture films is generally designated at 10. It includes a machine frame having base portions 11, side walls 12, a top wall 13, and a front frame portion 14 which is preferably rearwardly slanting.

The machine frame preferably has a lower recess portion 15 for accommodating the legs of the operator of the machine and an upper recess portion 16 for accommodating a working surface 17 on which visual inspection of the motion picture film and repairs thereto may be made.

The machine removably receives a rewind reel 18 carrying a motion picture film 19 to be cleaned and inspected and a spaced apart take up reel 20 for taking up the motion picture film 19 as it is being cleaned and inspected. The motion picture film 19 extends from the rewind reel 18 to the take up reel 20 across the upper portion of the machine frame. The rewind reel 18 and the take up reel 20 are removably secured to and driven by rewind and take up spindles 21 and 22 respectively.

The rewind spindle 21 is driven by a rewind motor assembly carried by the front face 14 of the machine frame at the rear thereof and it includes a rewind motor 23 and a brake 24 as illustrated diagrammatically in FIG. 2. Likewise, the take up spindle 22 is driven by a take up motor assembly carried by the rear of the front face 14 of the motor frame and includes a motor 25 and a brake 26 also diagrammatically illustrated in FIG. 2. A capstan 28, if utilized, is driven by a capstan motor assembly including a motor 29. However, the capstan 28 and its motor 29 are not carried by the machine frame but instead, as will be pointed out hereafter, is carried by a module panel 40 of a capstan module 36 removably securable to the front face 14 of the machine frame.

The motors 23, 25, and 28 are shunt motors and the brakes 24 and 26 are preferably magnetic brakes and they are cotrolled by a motor and brake control means 30 which is preferably a solid state control means carried by the frame 10 above the work surface 17 of the machine.

The upper portion of the front face 14 of the machine frame is provided with means for selectively receiving separate modules along the motion picture film 19 between the rewind reel 18 and the take up reel 20. In this respect, the front face 14 of the frame has an elongated opening 32 substantially the wideth of the frame as illustrated in FIG. 1A. The separate modules comprise a film cleaning module 33 having a module panel 37, a film inspecting module 34 having a module panel 38, a film footage counter module 35 having a module panel 39 and a capstan module 36 having a module panel 40. The rear portions of these modules extend through the elongated opening 32 of the frame and the panels of these modules are removably secured to the machine frame by screws 41 or the like. FIG. 1A shows the module panel 37 of the cleaning module 33 secured to the frame over the elongated opening 32 in the frame.

As expressed above, the capstan 28 and the capstan motor assembly 29 are carried by the module panel of the capstan module 36. This module 36 may also include a roller 44 carried by a lever 45 attached to a switch operating shaft 46, the roller 44 being spring biased downwardly against the motion picture film 19. So long as the motion picture film 19 is intact, it holds the roller 44 upwardly. If, however, the motion picture film should break, the roller 44 swings downwardly to operate a switch which is coupled by electrical conductors 47 to the motor control means 30.

The film footage counting module 35 has a pair of rollers 49 and 50 carried by the module panel 39 thereof and when it is desired to count the film footage, the motion picture film 19 is threaded over these rollers 49 and 50 as illustrated in FIG. 2. The roller 50 operates a mechanical counter 51 carried by the module panel 39 for counting and indicating the footage of the motion picture film passing thereby. During rewind or inspection of the motion picture film 19 the film may be removed from the rollers 49 and 50 as illustrated in FIG. 1.

The motion picture film inspecting module 34 is coupled to the motor control means 30 by electrical conductors 53. The motion picture film inspecting module is preferably of the form illustrated in FIGS. 3 to 17 which will be described hereafter.

The motion picture film cleaning module 33 is preferably of the form illustrated in FIGS. 18 to 21 and will be described hereafter. The motor 23 and brake 24 of the rewind motor assembly are coupled by electrical conductors 55 and 56 to the motor control means 30 and likewise the motor 25 and brake 26 of the take up motor assembly are coupled to the control means 30 by electrical condcutors 57 and 58. In a like manner, the motor 29 of the capstan motor assembly 36 is coupled to the motor control means 30 by electrical conductors 59.

The control means 30 which controls the motors 23, 25, and 29 and the brakes 24 and 26 in response to the operation of the film on the motion picture film detecting module 34 and the film breakage switch of the capstan module 36 also includes further control devices. In this respect, it includes a power toggle switch 61 for turning the power to the machine on or off and a bullseye lamp 62 indicates when the machine power is on. The control means also includes a two position rotary switch 63 for forward inspect movement of the motion picture film 19 or for backward rewind movement thereof. A rheostat or potentiometer 64 controls the voltage applied to the motors 25 and 29 for controlling the forward or inspect speed of the motion picture film. A rheostat or potentiometer 65 controls the voltage to the motor 23 to regulate the rearward or rewind speed of the motion picture film 19. The control means further includes a stop switch 66 for stopping operation of the various motors and it may contain a light which is on at all times. The control means 30 further includes a start switch 67 for starting operation of the motors 23, 25, and 29 and which preferably contains a light which turns on upon the detection of a defect in the motion picture film by the film inspecting module 34 or upon a breakage of the motion picture film as detected by the breakage switch in the capstan module 36. The control means 30 also preferably includes a splice counter 68 which is controlled by the film inspecting module 34. It further includes an electrical outlelt 69 for equipment to be utilized on the table 17 for making repairs to the motion picture film 19 as defects are detected therein. When work is to be done on the film to correct defects or the like, the film is drawn down from its normal position onto the table surface 17 for the purpose of inspection and making the repairs.

The motor 23 of the rewind motor assembly operates in one direction to rewind the motion picture film 19 on the rewind reel 18 and it has dynamic braking during cleaning and/or inspection as the film 19 is being withdrawn from the rewind reel 18 onto the take up reel 20. The motor 25 of the take up motor assembly operates in one direction to take up the motion picture film 19 on the take up reel 20 as the film is being cleaned and/or inspected. It has dynamic braking during rewind when the film 19 is being withdrawn from the take up reel 20 by the rewind reel 18. The motor 29 of the capstan assembly operates in one direction to advance the film 19 from the rewind reel 18 to the take up reel 20 at a constant speed and it is open circuited and coasts during the period that the film 19 is being rewound on the rewind reel 18 from the take up reel 20. When either of the motors 23 and 25 are deenergized and stopped, both of the brakes 24 and 26 are energized and the motor 29 is dynamically braked so as to promptly stop the advancing or the rewinding of the motion picture film 19. The motors 23, 25, and 29 are stopped by breakage of the motion picture film 19 through the automatic stop switch operated by the roller 44 of the capstan module or by the presence of a weak splice or a cut or tear or a tear out at the sprocket and sound edges of the motion picture film, by sprocket hole elongation or by the presence of tape on the motion picture film as detected by the film inspecting module 34. The film inspecting module 34 also detects normal splices in the motion picture film 19 and the numbers of such splices are recorded by the splice recorder 68.

The preferred form of the motion picture film inspecting module, generally designated at 34, is illustrated in more detail in FIGS. 3 to 17. A first roller 75 is mounted for rotation on the front side of the module panel 38 in fixed position with respect thereto. In this respect, the roller 75 is rotatably mounted by ball bearings 76 on a stud 77 which is screwed into the module panel 38. Spacers 78 about the stud fix the longitudinal positions of the ball bearings 76 and hence of the roller 75. A collar 79 secured in place by a screw 80 threaded into the stud 77 holes the inner races of the ball bearings 76 and spacers 78 in proper position on the stud 77. The roller 75 has a film guiding flange 81 for guiding the motion picture film 19 where it extends circumferentially on the roller 75. The roller 75 also has a tapered portion 82 to facilitate feeding of the motion picture film 19 onto the roller. The roller 75 is also undercut as indicated at 83 in alignment with the sprocket holes in the motion picture film 19 so that the sprocket hole portions of the film 19 are spaced from the unsupported by the collar 75.

A second roller 85 is also secured to the front side of the module panel 38 in fixed position with respect thereto and in this respect it is rotatably mounted by ball bearings 86 on a stud 87 screw threadably mounted in the module panel 38. The stud 87 has a head 88 and the head 88 along with spacers 89 longitudinally position the inner race of the ball bearings 86 with respect to the stud 87 to longitudinally fix the position of the roller 85. The central portion of the roller 85 is provided with an annular groove 90 to provide a pair of annular flanges 91 which are engaged by the motion picture film 19 as it is circumferentially arranged on the roller 85. The sprocket and sound edges of the motion picture film 19 which extend beyond the flanges 91 are unsupported by the roller 85.

A third roller 93, which is a film guide roller is fixedly mounted with respect to the module panel 38. In this connection, this third roller 93 is rotatably mounted by ball bearings 94 on a stud screwed into the module panel 38. Spacers 96 longitudinally position the inner races of the ball bearings 94 and the third roller 93 with respect to the stud 95. A cap 97 having a hole 98 is received on the stud 95 and engages one of the spacers 96, the collar 97 being held in place by a screw 99 threaded into the end of the stud 95 and a lock washer 100. The collar 97 also includes a hole 101 for receiving the enlarged head 88 of the stud 87 to provide a rigid out-board support for the studs 87 and 95. The third roller 93 is also preferably provided with a snap ring 102 to assist in maintaining the longitudinal position of the roller 93 with respect to the stud 95.

The film guide roller 93 is provided with a pair of guide flanges 104 which are adapted to engage the edges of the motion picture film 19. The roller 93 is also provided with recesses 105 to provide annular flanges 106 for supporting the motion picture film 19 only along the side edge portions of the film 19.

The motion picture film 19 as it is being advanced from the rewind reel to the take up reel extends first circumferentially over the first roller 75, engages the third or guide roller 93 to be guided thereby, then circumferentially engages the second roller 85, and then engages and is guided by the third roller 93, all as illustrated in FIG. 3.

Lighting means and light detecing means carried by the front side of the module panel 38 are associated with the motion picture film 19 where it circumferentially engages the first roller 75 and the second roller 85. In this respect, a first block 110 is secured to the module panel 38 by screws 111. This block 110, as shown more clearly in FIG. 9, has a pair of aligned holes 112 and 113 which are substantially tangentially arranged with respect to the motion picture film 19 as it circumferentially courses the first roller 75. These holes are arranged substantially midway across the motion picture film 19 where it is supported by the roller 75. The block 110 also has an irregularly shaped recess 109 which is adapted to receive and cut off light reflected by the film 19 at the roller 75. The hole 112 receives a light transmitting fiber optic light guide 114 for directing a light beam onto the motion picture film 19 and into the hole 113. The hole 113 receives a light sensitive electronic semiconductor diode 115 having electrical leads 116.

As shown in FIG. 9, a portion of the liquid beam afforded by the light guide 114 passes the motion picture film 19 and is detected by the diode 115 while other portions of the light beam are reflected by the motion picture film 19 into the cavity 109. When the motion picture film 19 is normal and has only one thickness coursing the roller 75, some of the light beam is detected by the diode 115, this being the normal situation. When, however, a splice is present in the motion picture film 19, as indicated in FIG. 10, the light beam is interrupted by the splice and is deflected into the cavity 109. The diode 115 detects this interruption of the light beam. Since the splice is relatively narrow, the double thickness of the splice interrupts the light beam for only a short interval of time. In this way, the detecting means detects splices in the motion picture film 19.

When the motion picture film 19 has tape thereon, as for securing together the ends of a broken film the tape causes an increased thickness and extends along the film for a greater distance than would a normal splice, as indicated in FIG. 11. The tape on the film 19 therefore interrupts the light beam for a longer period of time, this interruption of the light beam being detected by the diode 115. Thus, FIG. 9 illustrates the normal condition of the motion picture film 19. FIG. 10 illustrates the operation when the film 19 has a splice, and FIG. 11 illustrates the operation when the film has a tape thereon.

Another block 118 is secured to the block 110 by screws 119. This block overlies the sprocket hole portion of the motion picture film 19 where it courses the first roller 75 and because of the annular recess 83 in the roller 75 the sprocket hole portion of the film is spaced from the roller 75 and hence unsupported thereby.

As shown more clearly in FIG. 12, the block 118 is provided with a hole 120 which is substantially normal to the motion picture film 19 where it courses the first roller 75. The block 118 is also provided with a pair of holes 122 and 123 which are arranged substantially at right angles to each other with the hole 122 being on one side of the hole 120 and the hole 123 being on the other side of the hole 120. A light transmitting fiber optic light guide 124 is received in the hole 120 for projecting a light beam on the sprocket hole portion of the film 19 as it courses the first roller 75. The holes 122 and 123 each receive a light sensitive electronic semiconductor diode 125 and 126 respectively which are provided with electrical leads 127 and 128. The light guide 124 directs a light beam onto the motion picture film 19 as it courses the roller 75 to be reflected by the motion picture film to the diodes 125 and 126. When a normal sprocket hole passes the light beam, the light reflection to the diode 126 will first be interrupted and restored and then the light reflection to the diode 125 will be interrupted and restored, but the light reflection to both diodes 125 and 126 is not interrupted at the same instant. This normal condition is illustrated in FIG. 12.

If, however, an elongated sprocket hole should appear, the light reflection to the diode 126 will not be restored before the light reflection to the diode 125 is interrupted so that the light reflection to both diodes 125 and 126 is interrupted at the same instant for a detectable period. This condition is detected by the diodes 125 and 126 and is illustrated in FIG. 13.

A third block 130 is secured to the module panel 38 by means of screws 131 adjacent the second roller 85. This block has a pair of parallel holes 132 and a pair of parallel holes 134, the holes 132 and 134 of each pair being at substantially right angles to each other as illustrated in FIG. 14. The holes 132 and 134 of one pair overlie the sound edge portion of the film 19 and the holes 132 and 134 of the other pair overlie the sprocket edge portion of the film 19, these edge portions being unsupported by the roller 85.

As shown more clearly in FIG. 14, the holes 132 each receive a light transmitting fiber optic light guide 133 and the holes 134 each receive a light sensitive electronic semiconductor diode 135 having electrical leads 136.

The light beams projected by the light guides 133 onto the unsupported edge portions of the motion picture film 19 are reflected thereby to the light sensitive diodes 135 as illustrated in FIG. 14, this representing the normal operating condition.

If, however, the motion picture film 19 has a weak splice, the splice at the edge portions of the film will separate somewhat as illustrated in FIG. 15 so as to interrupt the reflection of the light beams onto the diodes 135, this interruption being detected by these diodes.

If there should be a tear out in the edge portions of the film 19, the light beams will extend through these tear outs and will not be reflected against the diodes 135, the diodes detecting this tear out condition as illustrated in FIG. 16.

If the edge portions of the motion picture film 19 have cuts or tears therein, the unsupported edge portion will extend outwardly as indicated in FIG. 17 at the cuts or tears so as to interrupt the reflection of the light beams onto the diodes 135, the diodes also detecting this condition as illustrated in FIG. 17.

Figure 4:
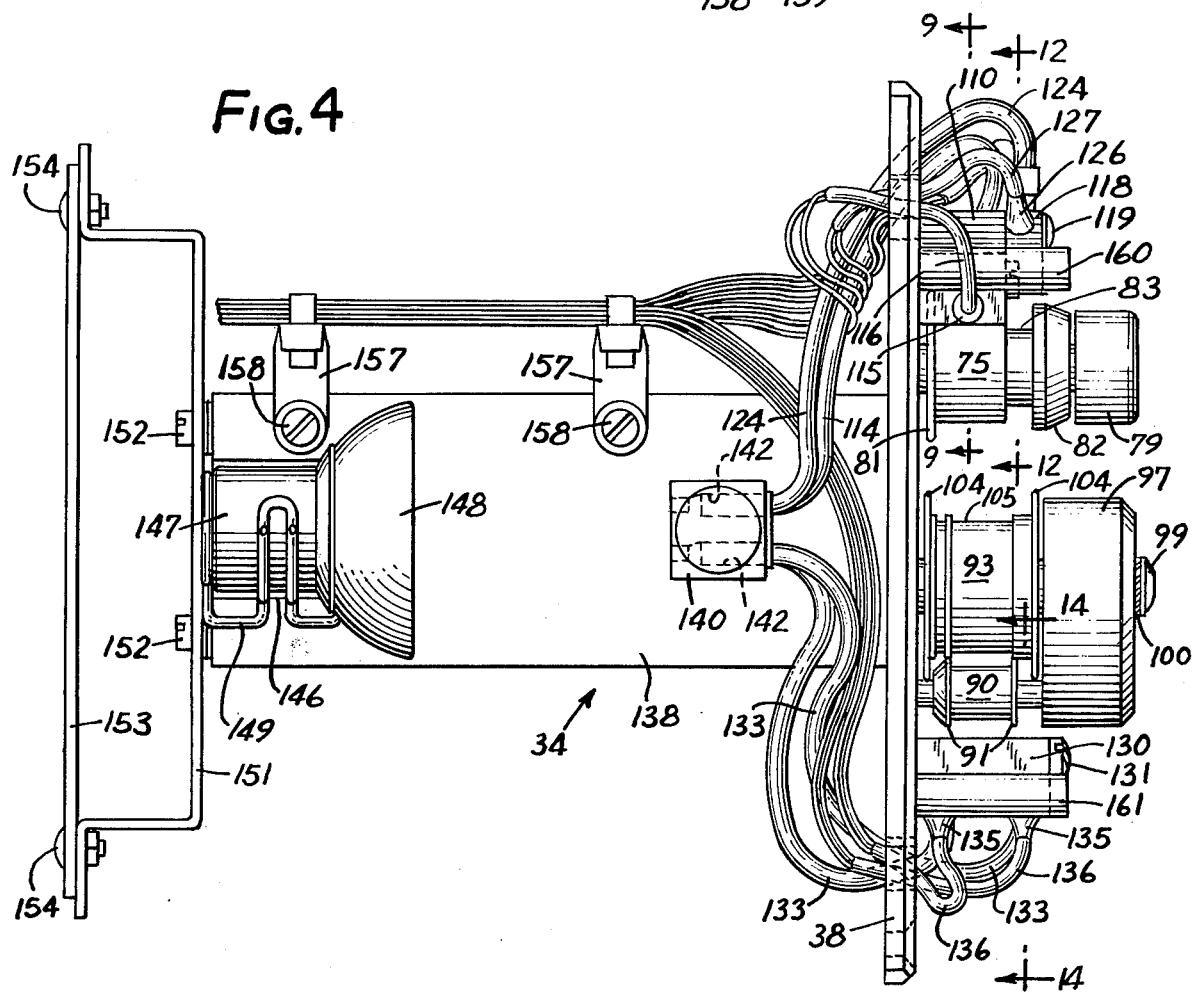
FIG. 4 is a top plan view of the motion picture film inspecting module illustrated in FIG. 3.
Figure 18:
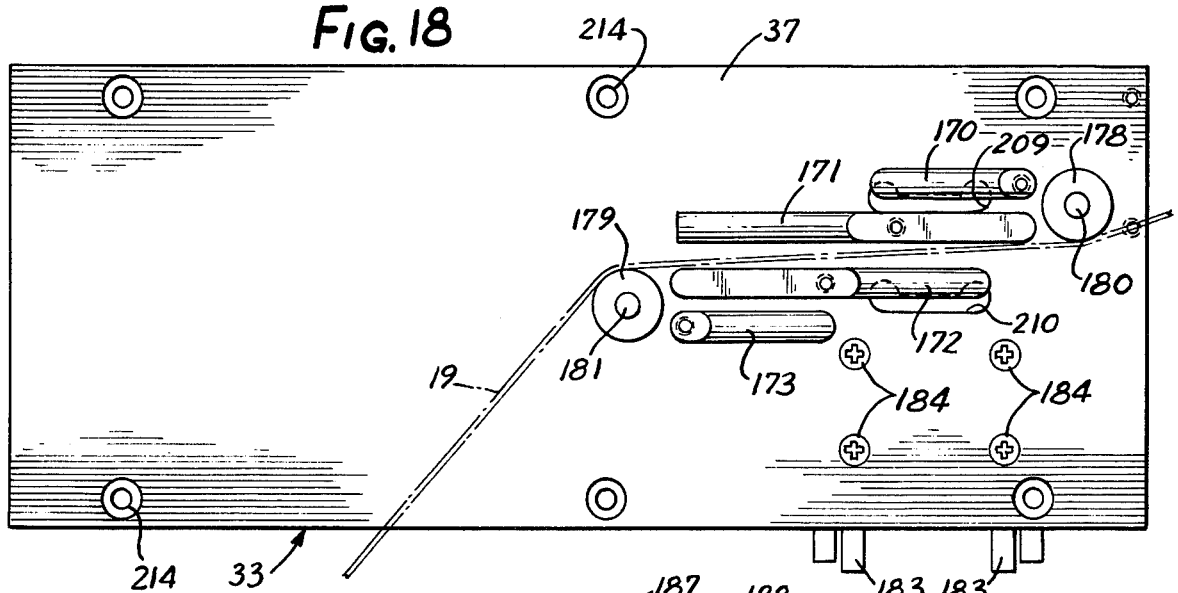
FIG. 18 is a front elevational view of the preferred form of the motion picture film cleaning module with the covers omitted and with the cleaning tape omitted.
Figure 19:
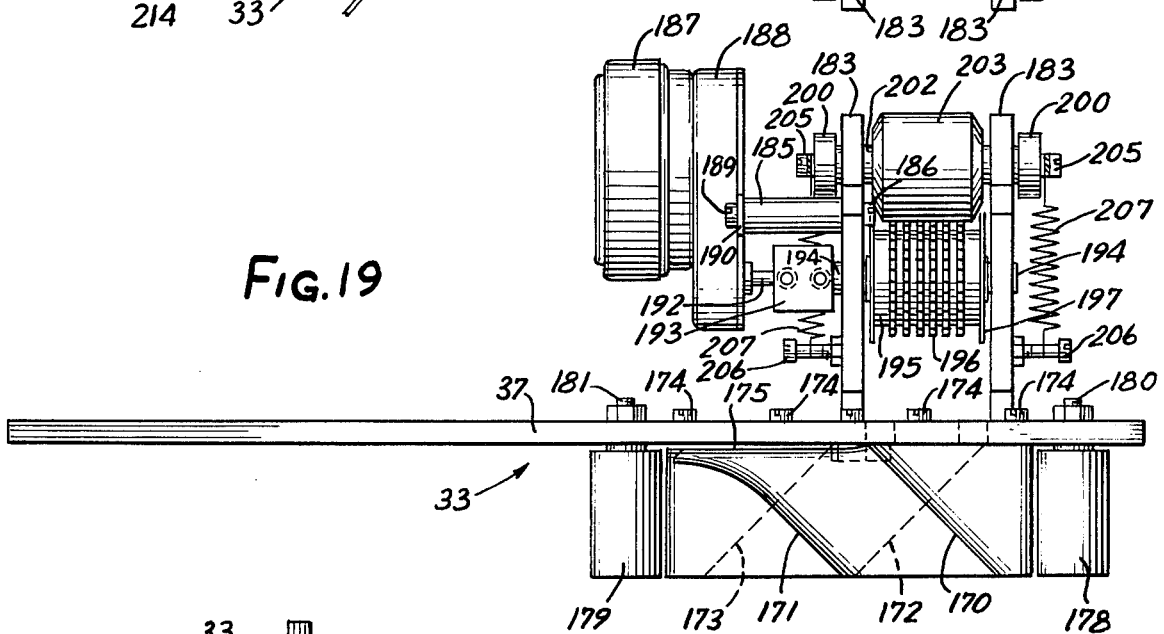
FIG. 19 is a top plan view of the cleaning module illustrated in FIG. 18.
Figure 20:
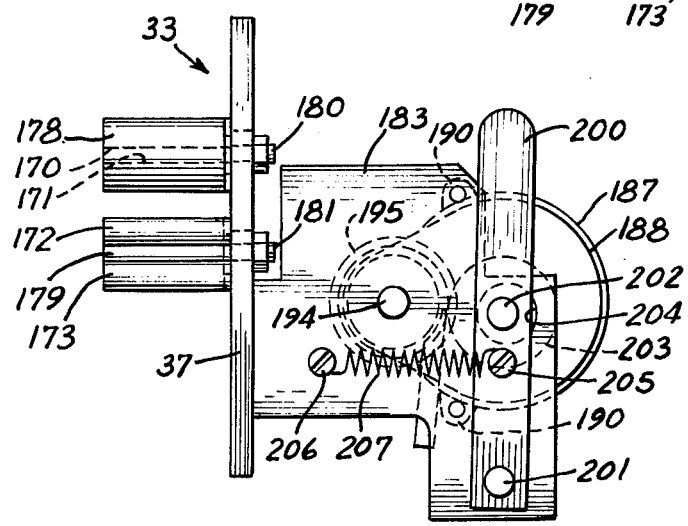
FIG. 20 is an end view of the cleaning module looking from the right of FIG. 18 and with the cleaning tape guides omitted for clarity.

A shelf 138 is secured to the rear side of the module panel 38 by means of screws 139. A post 140 is secured to the shelf 138 by screws 141 and this post has a plurality of holes 142 therethrough which receive the rear ends of the light transmitting fiber optic light guides 114, 125, and 133 as illustrated in FIGS. 4 and 8. The module panel 38 is provided with openings 143 and 144 to accommodate the extension of the light guides 114 and 124 and the light guides 133, respectively, from the front of the module panel 38 to the rear thereof.

The shelf 138 also carries a socket 146 which releasably carries a lamp assembly 147 having a reflector 148. The lamp assembly 147 is secured to the socket 146 by a spring clip 149. The lamp assembly 147 directs light onto the rear ends of the light guides 114, 124, and 133 in the post 140, and these light guides light to the front ends thereof to direct light beams onto the motion picture film as illustrated in FIGS. 9 to 17.

A bracket 151 is secured by screws 152 to the end of the shelf 138 and this bracket carries a terminal panel 153 by means of screws 154. The module panel 38 contains an opening 155 through which the electrical leads 116, 127, and 128 extend from the front of the module panel to the rear thereof. Likewise, the module panel 38 has an opening 156 through which the electrical leads 136 extend from the front of the panel to the rear of the panel. The electrical leads 116, 127, 128, and 136 are arranged in a harness and held in place by harness clamps 157 securd to the shelf 138 by screws 158. These electrical leads extend to terminals on the terminal panel 153 which may contain resistors and/or potentiometers for controlling the biases on the various light sensitive electronic semiconductor diodes. These terminals on the terminal panel 153 are suitably coupled to the motor control means 30 for controlling the rewind motor 23 and brake 24 for the rewind reel 18, the take up motor 25 and brake 26 for the take up reel 20 and the motor 29 for the capstan 28 as described above. Should any defects appear in the film as illustrated in FIGS. 9 to 17 these motors are immediately stopped so that the film may be visually inspected and repaired if necessary.

The front of the module panel 38 carries two pairs of posts 160 and 161 for accommodating covers for the blocks 110, 118, and 130, which covers in addition to enclosing the blocks also enclose the light guides and electrical leads on the front side of the module panel 38. The module panel 38 is provided with holes 162 for removably securing the motion picture film detecting module 34 to the module receiving means of the machine frame.

The preferred motion picture film cleaning module is generally designated at 33 in FIGS. 18 to 21. A plurality of tape guides 170, 171, 172, and 173 are suitably secured to the front side of the module panel 37 by means of screws 174. As shown more clearly in the diagrammatic illustration of FIG. 21 and also in FIG. 19, a portion of the rear of the tape guide 171 is rounded and spaced from the module panel 37 as indicated at 175. Likewise, a portion of the rear of the tape guide 172 is also rounded and spaced from the module panel 37 as indicated at 176. It is also noted that the ends of the tape guides 170, 171, 172, and 173 are also rounded.

A roller 178 rotatably mounted on a stud 180 carried by the module panel 37 is preferably arranged adjacent the tape guides 170 and 171. In a like manner, a roller 179 rotatably mounted on a stud 181 carried by the module panel 37 is also preferably arranged adjacent the tape guides 172 and 173.

A pair of brackets 183 are secured to the rear of the module panel 37 by means of screws 184. A pair of spacers 185 are secured by screws 186 to one of the brackets 183 for supporting a combination electric motor 187 and gear reducer 188. In this connection, the gear reducer 188 is provided with tabs 190 which receive screws 189 for securing the gear reducer 188 and electric motor 187 to the spacers 185. The gear reducer 188 operates a shaft 192 which is connected by a coupling 193 to a shaft 194 journaled in the brackets 183. The shaft 194 carries a roll 195 having end tape guide flanges 197 and serrated portions 196 between the guide flanges.

A pair of levers 200 are pivoted at 201 to the brackets 183. A shaft 202 extends between the levers 200 and is accommodated by enlarged holes 204 in the brackets 183. The shaft 202 carries a roll 203 which preferably has a resilient surface formed of rubber or the like. Each of the levers 200 has a screw 205 to which one end of springs 207 are attached. The other ends of the springs 207 are attached to screws 206 carried by the brackets 183. The springs 207 operate to resiliently urge the roll 203 against the roll 195 to form a pair of nipping rolls.

The module panel 37 is provided with an opening 209 therethrough below the tape guide 170 and it is also provided with a second opening 210 below the tape guide 172. These openings 209 and 210 are for the purpose of accommodating a cleaning tape 212. The cleaaning tape is preferably formed from linen cloth or paper having good cleaning surfaces on both sides thereof.

The cleaning tape 212 is drawn from a source of cleaning tape such as a roll 213 thereof through the opening 209 and the cleaning tape 212 is threaded over the tape guide 170, the roller 178, the tape guide 171, the tape guide 173, the roller 179, and the tape guide 172 through the opening 210 to the nipping rolls 195, 203. Rotation of the nipping rolls 195 and 203 by the electric motor 187 and gear reducer 188 causes the tape 212 to advance from the roll 213 over the tape guides 170, 171, 173, and 172 and rollers 178 and 179. The motion picture film 19 extends over the cleaning tape on the roller 179 and the tape guide 172 and under the cleaning tape on the tape guide 171 and the roller 178. Thus, the motion picture film 19 engages and is cleaned by the cleaning tape 212 on the tape guides 172 and 171 and/or the rollers 178 and 179.

As shown in FIG. 21, one side of the cleaning tape 212 is identified by +++ and the other side thereof is designated by $^{oo}$. The +++ side of the cleaning tape 212 is reversed by the tape guide 170 and after passing over the roller 178 and below the tape guide 171 the $^{ooo}$ side of the cleaning tape 212 is caused to engage one (top) side of the motion picture film 19. The cleaning tape 212 as it passes over the rear 175 of the tape guide 171 and the rear 176 of the tape guide 172 is reversed and is caused to laterally bypass the motion picture film 19. The cleaning tape 212 after passing over the tape guide 173 and roller 181 and the tape guide 172 presents the +++ side of the cleaning tape to the other (bottom) side of the motion picture film 19 for contacting and cleaning that side. The tape guide 172 then directs the cleaning tape 212 through the opening 210 in the module panel 37 to the nipping rolls 195 and 203 at the rear of the module panel 37.

By this arrangement a single cleaning tape is utilized and one side of the cleaning tape engages and cleans one side of the motion picture film while the other side of the cleaning tape engages and cleans the other side of the motion picture film. The driven nipping rolls 195 and 203 operate to continuously present fresh cleaning surfaces for engaging and cleaning both sides of the motion picture film. The rear of the module panel 37 may carry a cleaning fluid fountain for wetting the cleaning tape with a suitable film cleaning fluid, if this be desired, as the cleaning tape is being advanced through opening 209 in the module panel.

The cleaning tape guides 170, 171, 172, and 173 are provided with tapped holes for receiving screws for securing separate covers over the tape guides 170 and 171 and roller 178 and over the tape guides 172 and 173 and roller 179 for covering the same and the cleaning tape 212 guided thereby. The separate covers expose the cleaning tape 212 above the roller 179 and tape guide 172 and below the tape guide 171 and roller 178 and permit lateral insertion of the motion picture film 19 between the cleaning tape at these points. The module panel 37 is provided with mounting holes 214 for removably securing the motion picture film cleaning module 34 to the module receiving means of the machine frame.

While for purposes of illustration one form of this invention has been disclosed, other forms thereof may become apparent to those skilled in the art upon reference to this disclosure and, therefore, this invention is to be limited only by the scope of the appended claims.

We claim:

1. In a machine which is capable of cleaning motion picture films and inspecting motion picture films with respect to splices, tears or breaks, sprocket hole elongations, or the like, including a supporting frame having a front face portion, a rewind motor assembly carried by the supporting frame having a rewind spindle for removably receiving a rewind reel at the front face portion of the supporting frame containing a motion picture film to be cleaned and/or inspected and/or a motion picture film to be rewound thereon, a take up motor assembly carried by the supporting frame, spaced from the rewind motor assembly, having a take up spindle for removably receiving a take up reel at the front face portion of the supporting frame to receive and wind thereon a motion picture film which has been cleaned and/or inspected, said motion picture film extending along the front face portion of the supporting frame between said rewind reel and said take up reel, motor control means for controlling said take up motor assembly and said rewind motor assembly, the improvement in said combination wherein said supporting frame has module receiving means selectively to receive separate modules along the motion picture film between said rewind reel and said take up reel and including an opening in the front face portion of the supporting frame and adjacent securing means, one of said modules comprising a motion picture film cleaning module having a panel removably securable to the securing means of the module receiving means of the supporting frame and cleaning means carried by the panel extending rearwardly therefrom into the opening of the module securing means and forwardly therefrom for cleaning both sides of the motion picture film as it passes thereby, another of said modules comprising a motion picture film inspecting module having a panel removably securable to the securing means of the module receiving means of the supporting frame and detecting means carried by the panel extending rearwardly therefrom into the opening of the module receiving means and forwardly therefrom for inspecting the motion picture film as it passes thereby with respect to splices, tears or breaks, sprocket hole elongation, or the like, said motion picture inspecting module being selectively coupled to said motor control means to stop said take up motor assembly and rewind motor assembly in the event of improper splices, tears or breaks, sprocket hole elongation, or the like in the motion picture film as it passes the motion picture film inspecting module.

2. In a machine which is capable of cleaning motion picture films and inspecting motion picture films with respect to splices, tears or breaks, sprocket hole elongations, or the like, including a supporting frame having a front face portion, a rewind motor assembly carried by the supporting frame having a rewind spindle for removably receiving a rewind reel at the front face portion of the supporting frame containing a motion picture film to be cleaned and/or inspected and/or a motion picture film to be rewound thereon, a take up motor assembly carried by the supporting frame, spaced from the rewind motor assembly, having a take up spindle for removably receiving a take up reel at the front face portion of the supporting frame to receive and wind thereon a motion picture film which has been cleaned and/or inspected, said motion picture film extending along the front face portion of the supporting frame between said rewind reel and said take up reel, motor control means for controlling said take up motor assembly and said rewind motor assembly, the improvement in said combination wherein said supporting frame has module receiving means selectively to receive separate modules along the motion picture film between said rewind reel and said take up reel and including an opening in the front face portion of the supporting frame and adjacent securing means, one of said modules comprising a motion picture film cleaning module having a panel removably securable to the securing means of the module receiving means of the supporting frame and cleaning means carried by the panel extending rearwardly therefrom into the opening of the module receiving means and forwardly therefrom for inspecting the motion picture film as it passes thereby with respect to splices, tears or breaks, sprocket hole elongation, or the like, another of said modules comprising a capstan module having a panel removably securable to the module receiving means of the supporting frame, and a capstan motor assembly carried by the panel including a motor extending rearwardly therefrom into the opening of the module receiving means and a capstan extending forwardly therefrom engaging the motion picture film for advancing the same at constant linear speed from the rewind reel to the take up reel, said motor control means also including means for controlling said capstan motor assembly, said motion picture inspecting module being selectively coupled to said motor control means to stop said take up motor assembly and rewind motor assembly and said capstan motor assembly of said capstan module in the event of improper splices, tears or breaks, sprocket hole elongation, or the like in the motion picture film as it passes the motion picture film inspecting module.

3. A machine as defined in claim 2 wherein said capstan module also includes a motion picture film breakage detecting means carried by the panel and engageable with the motion picture film said motion picture film breakage detecting means also being selectively coupled to said motor control means also to stop said take up motor assembly and rewind motor assembly and said capstan motor assembly of said capstan module in the event of breakage of the motion picture film.

4. A machine as defined in claim 1 wherein said detecting means of said motion picture inspecting module comprises lighting means carried by the module panel for directing light beams on the motion picture film as it is advanced from the rewind reel to the take up reel, said light beams being reflected by the motion picture film, and light detecting means carried by the module panel controlled by the reflectance of the light beams by the motion picture film for detecting splices, tears or breaks, sprocket hole elongation, or the like therein.

5. A machine as defined in claim 1 wherein said detecting means of said motion picture film inspecting module comprises at least one roller carried by the module panel over which the motion picture film circumferentially extends as the motion picture film is advanced from the rewind reel to the take up reel, at least one lighting means carried by the module panel for directing a light beam at a given angle with respect to the motion picture film as it circumferentially extends over said at least one roller, at least one light detecting means carried by the module panel for detecting the light beam of said at least one lighting means and the reflectance thereof by the motion picture film as it is advanced over said at least one roller for detecting splices, tears or breaks, sprocket hole elongation, or the like therein.

6. A machine as defined in claim 5 wherein said at least one lighting means comprises a light transmitting fiber optic light guide extending from a light source.

7. A machine as defined in claim 5 wherein said at least one light detecting means comprises a light sensitive electronic semiconductor diode.

8. A machine as defined in claim 1 wherein said detecting means of said motion picture film inspecting module comprises a roller carried by the module panel over which the motion picture film circumferentially extends as the motion picture film is advanced from the rewind reel to the take up reel, lighting means carried by the module panel for directing a light beam substantially tangentially to the motion picture film between the edges thereof where it circumferentially extends over the roller, light detecting means carried by the module panel in substantial alignment with said light beam for receiving and detecting the light beam when a single thickness of the motion picture film circumferentially extends over the roller, said light beam and the detection thereof by said light detecting means being interrupted by additional thickness of the motion picture film caused by splices in and tape on said motion picture film.

9. A machine as defined in claim 1 wherein said detecting means of said motion picture film inspecting module comprises a roller carried by the module panel over which the motion picture film circumferentially extends as the motion picture film is advanced from the rewind reel to the take up reel, the sprocket hole portions of the motion picture film being free from and unsupported by the roller, lighting means carried by the module panel for directing a light beam substantially normal to the motion picture film at the sprocket hole portions thereof where it circumferentially extends over the roller, light detecting means carried by the module panel on each side of the lighting means at the sprocket hole portions of the motion picture film for receiving light reflected from the lighting means by the sprocket hole portions of the motion picture film where it circumferentially extends over the roller, said light being reflected to at least one of said light detection means for a normal sprocket hole, and said light reflection to both said light detecting means being interrupted at the same instant for a detectable period in response to an increase in sprocket hole length.

10. A machine as defined in claim 1 wherein said detecting means of said motion picture film inspecting module comprises a roller carried by the module panel over which the motion picture film circumferentially extends as the motion picture film is advanced from the rewind roll to the take up roll, the edge portions of the motion picture film being free from and unsupported by the roller, a pair of lighting means carried by the module panel for directing a pair of light beams at an angle to the motion picture film at the unsupported edge portions thereof where it circumferentially extends over the roller, a pair of light detecting means carried by the module panel for receiving light reflected from the pair of lighting means by the edge portions of the motion picture film where it circumferentially extends over the roller, said light reflection to said light detecting means being interrupted by weak splices, tear outs and breaks or cuts at the edge portions of the motion picture film.

11. A machine as defined in claim 1 wherein said detecting means of said motion picture inspecting module comprises first and second rollers carried by the module panel over each of which the motion picture film circumferentially extends as the motion picture film is advanced from the rewind reel to the take up reel, first lighting means carried by the module panel for directing a light beam substantially tangentially to the motion picture film between the edges thereof where it circumferentially extends over the first roller, first light detecting means carried by the module panel in substantial alignment with said light beam of said first lighting means for receiving and detecting the light beam when a single thickness of the motion picture film circumferentially extends over the first roller, the light beam of the first lighting means and the detection thereof by the first light detecting means being interrupted by additional thickness of the motion picture film caused by splices in and tape on said motion picture film, the sprocket hole portions of the motion picture film being free from and unsupported by the first roller as the motion picture film circumferentially extends thereon, second lighting means carried by the module panel for directing a light means substantially normal to the motion picture film at the sprocket hole portions thereof where it circumferentially extends over the first roller, second light detecting means carried by the module panel on each side of the second lighting means at the sprocket hole portions of the motion picture film for receiving light reflected from the second lighting means by the sprocket hole portions of the motion picture film where it circumferentially extends over the first roller, said light being reflected to at least one of said light detecting means for a normal sprocket hole, and said light reflection to both said light detecting means being interrupted at the same instant for a detectable period in response to an increase in sprocket hole length, the edge portions of the motion picture film being free from and unsupported by the second roller as the motion picture film circumferentially extends thereover, third lighting means carried by the module panel for directing a pair of light beams at an angle to the motion picture film at the unsupported edge portions thereof where it circumferentially extends over the second roller, a third light detecting means including a pair of light detectors for receiving light reflected from the pair of light beams of the third lighting means by the edge portions of the motion picture film where it circumferentially extends over the second roller, said light reflection to said third light detecting means being interrupted by weak splices, tear outs and breaks or cuts at the edge portions of the motion picture film.

12. A machine as defined in claim 1 wherein said detecting means of said motion picture film inspecting module comprises rollers carried by the front of the module panel over which the motion picture film circumferentially extends as it is advanced from the rewind reel to the take up reel, lighting means carried by the front of the module panel and including light transmitting fiber optic light guides for directing light beams at fixed angles with respect to the motion picture film as it circumferentially extends over the rollers, light detecting means carried by the front of the module panel and including light sensitive electronic semiconductor diodes and electrical leads therefor for detecting the light beams of said lighting means and the reflection thereof by the motion picture film as it is advanced circumferentially over said rollers for detecting splices, tears or breaks, sprocket hole elongation, or the like therein, said module panel having openings therein for accommodating the extension of the light transmitting fiber optic light guides and the electrical leads of the light sensitive electronic semiconductor diodes to the rear of said module panel, a light source carried by the rear of said module panel for directing light onto the rear ends of said light transmitting fiber optic light guides, and terminals carried by the rear of said module panel for receiving the rear ends of the electrical leads from the light sensitive electronic semiconductor diodes.

13. A machine as defined in claim 1 wherein said cleaning means of said motion picture film cleaning module comprises a plurality of cleaning tape guides carried by the front side of the cleaning module panel with the motion picture film extending therebetween as it is moved between the rewind reel and the take up reel, a single cleaning tape threaded over said cleaning tape guides with one side of the cleaning tape engaging and cleaning one side of the moving motion picture film and with the other side of the cleaning tape engaging and cleaning the other side of the moving motion picture film, and means for advancing said cleaning tape over said cleaning tape guides to present fresh cleaning surfaces of the cleaning tape to the motion picture film as it engages and cleans both sides of the moving motion picture film.

14. A machine as defined in claim 1 wherein said cleaning means of said motion picture film cleaning module comprises a plurality of cleaning tape guides carried by the front side of the cleaning module panel with the motion picture film extending therebetween as it is moved between the rewind reel and the take up reel, a single cleaning tape threaded over said cleaning tape guides with one side of the cleaning tape engaging and cleaning one side of the moving motion picture film and with the other side of the cleaning tape engaging and cleaning the other side of the moving motion picture film, a first opening in the module panel for supplying the cleaning tape from a cleaning tape supply at the rear of the module panel to the cleaning tape guides on the front of the module panel, a second opening in the module panel for withdrawing the cleaning tape from the cleaning tape guides on the front of the module panel to the rear of the module panel, and cleaning tape advancing means by the rear of the module panel including an electric motor and nipping rolls rotated thereby for gripping the cleaning tape adjacent the second opening for advancing the cleaning tape from its supply through the first opening, over the cleaning tape guides and through the second opening to a point of discharge.

15. A machine as defined in claim 1 wherein said cleaning means of said motion picture film cleaning module comprises a plurality of cleaning tape guides carried by the front side of the cleaning module panel with the motion picture film extending therebetween as it is moved between the rewind reel and the take up reel, a single cleaning tape threaded over said cleaning tape guides, said cleaning tape guides causing one side of the cleaning tape to engage and clean one side of the moving motion picture film, causing the cleaning tape to laterally by-pass the moving motion picture film to the other side of the moving motion picture film, and causing the other side of the cleaning tape to engage and clean said other side of the moving motion picture film, and means for advancing said cleaning tape over said cleaning tape guides to present fresh cleaning surfaces of the cleaning tape to the motion picture film as it engages and cleans both sides of the moving motion picture film.

16. A machine as defined in claim 1 wherein said cleaning means of said motion picture film cleaning module comprises a plurality of cleaning tape guides carried by the front side of the cleaning module panel with the motion picture film extending therebetween as it is moved between the rewind reel and the take up reel, a single cleaning tape threaded over said cleaning tape guides, said cleaning tape guides causing one side of the cleaning tape to engage and clean one side of the moving motion picture film, causing the cleaning tape to laterally by-pass the moving motion picture film to the other side of the moving motion picture film, and causing the other side of the cleaning tape to engage and clean said other side of the moving motion picture film, a first opening in the module panel for supplying the cleaning tape from a cleaning tape supply at the rear of the module panel to the cleaning tape guides on the front of the module panel, a second opening in the module panel for withdrawing the cleaning tape from the cleaning tape guides on the front of the module panel to the rear of the module panel, and cleaning tape advancing means carried by the rear of the module panel including an electric motor and nipping rolls rotated thereby for gripping the cleaning tape adjacent the second opening for advancing the cleaning tape from its supply through the first opening, over the cleaning tape guides and through the second opening to a point of discharge.

17. A machine as defined in claim 1 wherein said motion picture inspecting module comprises at least one roller carried by the module panel in fixed position with respect to the module panel over which the motion picture film is laterally received and over which the motion picture film circumferentially extends as the motion picture film is advanced, at least one lighting means carried by the module panel in fixed relation with respect to the fixedly positioned roller for directing a light beam at a given angle with respect to the motion picture film as it extends circumferentially over said at least one fixedly positioned roller, at least one light detecting means carried by the module panel in fixed relation with respect to the fixedly positioned roller for detecting the light beam of said at least one lighting means and the reflectance thereof by the motion picture film as it is advanced over said at least one fixedly positioned roller for detecting splilces, tapes, tear outs, breaks or cuts or the like therein.

* * * * *